March 26, 1929. M. WELLS 1,706,907
ELECTRODE HOLDER
Filed March 12, 1928
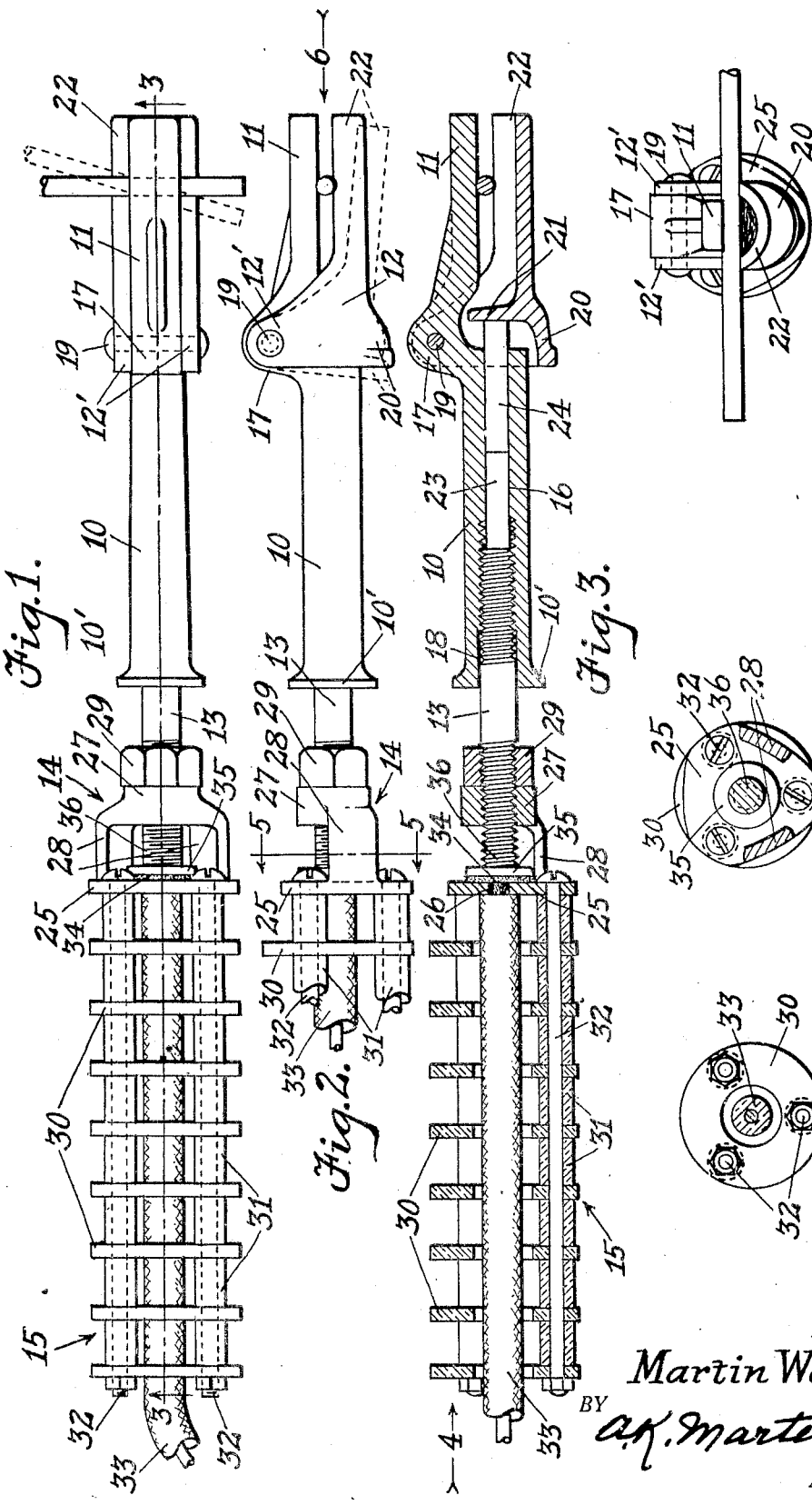

Patented Mar. 26, 1929.

1,706,907

UNITED STATES PATENT OFFICE.

MARTIN WELLS, OF LOS ANGELES, CALIFORNIA.

ELECTRODE HOLDER.

Application filed March 12, 1928. Serial No. 260,968.

My invention relates to electric welding tools and more particularly to an electrode holder for use in the process known as arc welding.

The primary object of my invention is to provide an exceptionally durable electrode-holding tool whereby the rod or carbon employed in arc welding readily may be gripped so as to be securely held at any desired angle when applying it to the work.

A further object is to provide an electrode holder of the character described which is convenient to handle, which readily may be manipulated to grip or release the electrode and which insures a positive and reliable hold thereon.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof—

Fig. 1 is a plan view of my electrode holder with a fragment of a metal rod gripped in the jaws thereof.

Fig. 2, is a fragmentary side view of the electrode holder shown in Fig. 1, part of the handle thereof being shown broken away.

Fig. 3, is a longitudinal sectional view of the electrode holder shown in Figs. 1 and 2, the section being taken on line 3—3 of Fig. 1.

Fig. 4, is an end view of the holder, looking at the handle thereof.

Fig. 5, is a transverse sectional view of the holder, taken on line 5—5 of Fig. 2.

Fig. 6, is an end view of the holder looking at the jaws thereof.

Considered more in detail the drawings will be seen to show my electrode holder as made up of a tubular shank 10 which is equipped with a fixed jaw 11 and a movable jaw 12, a screw-threaded shank 13 fitting in one end of said tubular shank, a connecting bracket 14, attached to said screw-threaded shank, and a composite handle 15 attached to said connecting bracket. One end of tubular shank 10 has a flange 10' formed thereon and this end is internally screw-threaded to receive threaded shank 13. Its other end is provided with a reduced bore 16 and fixed jaw 11 is formed integral with this other end, there being an arched connecting section 17 between them. The screw-threaded end of shank 10 is counter-bored as at 18 to afford protection to the threads of shank 13.

Movable jaw 12 is formed with a pair of spaced lugs 12' adapted to embrace arched section 17 of fixed jaw 11 and a pin 19, extending through said lugs 12' and said arched section 17, holds movable jaw 12 pivotally attached to fixed jaw 11. Spaced lugs 12' are made integral with a skirt portion 20 on movable jaw 12, which is adapted to swing under the end of tubular shank 10 so as to prevent the entrance of dirt or grit through bore 15 into the threaded portion thereof. A baffle plate 21 is formed within skirt 20 and between lugs 12' in spaced relation to the end of tubular shank 10, which baffle plate not only serves further to prevent dirt or grit from working into the threaded section of tubular shank 10 but also serves as a contact plate, as presently will appear. A semi-tubular extension 22, adapted to receive fixed jaw 11 and to co-operate therewith in gripping an electrode, is formed on movable jaw 12, said extension 22 and jaw 11 being somewhat prolonged so as jointly to resemble the beak of a bird.

Threaded shank 13 is a round bar threaded on both ends and having a reduced extension 23 loosely fitting reduced bore 16 of tubular shank 10. Extension 23 may be made long enough to butt against baffle plate 21 in movable jaw 12, but is preferably cut at a point within bore 16 so as to form a plunger pin 24, one end of which butts against baffle plate 21 while the other makes contact with reduced extension 23 of shank 13, as is clearly shown in Fig. 3. This construction lessens the wear on baffle plate 21, as is evident from the fact that extension 23 turns against the end of plunger pin 24 instead of against the baffle plate.

Connecting bracket 14 consists of a disc 25 with a central aperture 26 and a nut 27 adapted to receive the end of threaded shank 13, said disc and nut being held in spaced relation to and in axial alignment with each other by arms 28 made integral therewith. A lock-nut 29, adapted to screw up against nut 27, is mounted on shank 13 adjacent bracket 14 and between it and tubular shank 10.

Handle 15 is made up of a series of washers 30 held in spaced relation to each other by spacing tubes 31 and bound together and to disc 25 of connecting bracket 14 by long stove bolts 32 which extend through disc 25, washers 30 and spacing tubes 31, as shown in Fig. 3. Washers 30 and spacing tubes 31 are made of comparatively thick fibre, hard rubber or other suitable insulating material, so that a strong rigid handle thoroughly insulated against both heat and electric current is provided.

Connection of my electrode holder to an electric generator, through the usual conductor cable 33, is made by passing the cable through all of the washers 30 in the handle, baring the conductor for a short distance at the end of the cable, inserting the bared conductor through aperture 26 of disc 25, bending its filaments 34 outwardly from the center thereof and clamping them against disc 25 by inserting a clamping disc 35 under the end 36 of screw-threaded shank 13. Shank 13 is screwed through nut 27 against disc 34, so as to clamp the conductor filaments firmly between it and disc 26, and locknut 29 is finally screwed up against nut 27 so as to prevent shank 13 from turning therein when the handle is turned to adjust the jaws.

The operation of my electrode holder, in gripping a metal or carbon electrode as the case may be, is very simple. The handle first is turned in relation to tubular shank 10, until jaws 11 and 12 are opened sufficiently to permit the insertion of the electrode between the former and extension 22 of the latter. After the insertion of the electrode the handle is turned forwardly in tubular shank 10, the latter being held from turning by the electrode in an evident manner. A slight turn of the handle is sufficient to produce a firm grip on the electrode at any angle, and a slight turn in the reverse direction is sufficient to release it. It is evident that the gripping action of the jaws is due to the forcing of plunger pin 24, by shank 13 and extension 23, against baffle plate 21 which causes movable jaw 12 to turn on pivot pin 19 so as to swing extension 22 thereof toward fixed jaw 10.

It will be seen that my electrode holder has no springs or other small parts which may be injured or destroyed by the intense heat of the electric arc, it being operated by relatively heavy parts which are connected by threads and those threads being adequately protected from sparks and fragments of molten metal. Furthermore, the handle is made of such heavy material and in such rigid form that the tool, as a whole, is exceptionally safe and durable.

Having thus illustrated and described my invention, I claim:

1. An electrode holder comprising a tubular shank; a fixed jaw on one end of said tubular shank; a movable jaw pivotally attached to said fixed jaw, so as to co-act therewith in gripping an electrode; a handle turnable in said tubular shank and means in said tubular shank for actuating said movable jaw toward said fixed jaw when said handle is turned.

2. An electrode holder comprising a tubular shank having a flange formed on one end thereof; a fixed jaw on the opposite end of said tubular shank from said flange; a movable jaw pivotally attached to said fixed jaw, so as to co-act therewith in gripping an electrode; a screw-threaded shank adapted to screw into the flanged end of said tubular shank; an insulated handle rigidly fixed on said screw-threaded shank; a baffle plate in said movable jaw; and a plunger pin, in said tubular shank, adapted to engage with said screw-threaded shank and with said baffle plate so as to force said movable jaw toward said fixed jaw when said threaded shank is turned forwardly.

3. An electrode holder comprising a tubular shank having a flange formed on one end thereof; a fixed jaw on the opposite end of said tubular shank from said flange; a movable jaw pivotally attached to said fixed jaw, so as to co-act therewith in gripping an electrode; a screw-threaded shank adapted to screw into the flanged end of said tubular shank; a connecting bracket screwed onto said screw-threaded shank, said bracket being adapted to co-operate with said screw-threaded shank to clamp the usual electric current conductor; a lock nut on said screw-threaded shank adapted to lock said bracket thereto; a composite handle fixed to said bracket, said handle being made of insulating material; a baffle plate in said movable jaw, and a plunger pin in said tubular shank, between said baffle plate and the end of said screw-threaded shank, said plunger pin being adapted to transmit pressure from the latter to the former and thus to force movable jaw 12 toward fixed jaw 11 in a gripping action.

MARTIN WELLS.